(12) United States Patent
Brosnan

(10) Patent No.: US 8,836,666 B2
(45) Date of Patent: Sep. 16, 2014

(54) METHOD AND DEVICE FOR REDUCING NOISE INTERFERENCE IN A CAPACITIVE TOUCHSCREEN SYSTEM

(75) Inventor: Michael John Brosnan, Fremont, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 661 days.

(21) Appl. No.: 12/916,558

(22) Filed: Oct. 31, 2010

(65) Prior Publication Data

US 2012/0105353 A1    May 3, 2012

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0418* (2013.01)
USPC .......................................... 345/174; 375/346

(58) Field of Classification Search
USPC ........................................................ 375/346
See application file for complete search history.

(56) References Cited

U.S. PATENT DOCUMENTS

| | | | |
|---|---|---|---|
| 6,124,848 A | 9/2000 | Ballare et al. | |
| 7,277,087 B2 | 10/2007 | Hill et al. | |
| 2003/0067451 A1 | 4/2003 | Tagg et al. | |
| 2008/0158165 A1 | 7/2008 | Geaghan et al. | |
| 2010/0315384 A1* | 12/2010 | Hargreaves et al. | 345/179 |
| 2010/0324845 A1* | 12/2010 | Spanier et al. | 702/62 |
| 2011/0157067 A1* | 6/2011 | Wagner et al. | 345/174 |

FOREIGN PATENT DOCUMENTS

WO    WO 2009/083501    7/2009

* cited by examiner

*Primary Examiner* — Joe H Cheng
*Assistant Examiner* — Yaron Cohen
(74) *Attorney, Agent, or Firm* — Winston Hsu; Scott Margo

(57) ABSTRACT

Disclosed herein are various embodiments of means and methods for reducing noise interference in a capacitive touchscreen system. Second noise signals related to first noise signals generated by an external noise source are provided to a touchscreen controller, which determines fundamental and harmonic frequencies associated with the first noise signals. In response to determining the fundamental and harmonic frequencies associated with the first noise signals, the touchscreen controller may shift the frequency at which drive signals generated thereby are provided to a capacitive touchscreen. As a result, undesired interference between the first noise signals and the drive signals is minimized or avoided.

22 Claims, 14 Drawing Sheets

METHOD AND DEVICE FOR REDUCING NOISE INTERFERENCE IN A CAPACITIVE TOUCHSCREEN SYSTEM

FIELD OF THE INVENTION

Various embodiments of the invention described herein relate to the field of capacitive sensing input devices generally, and more specifically to means and methods for reducing noise interference in a capacitive touchscreen system.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC™. Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, the electric fields projecting from the electrodes are altered. As a result, the self-capacitance of the electrode increases. Many touch sensors are configured such that the external object is a finger. The human body is essentially a capacitor to earth where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of m×n intersections with only m+n pins on an IC.

Because capacitive touch controllers 100 such as an Avago AMRI-5000 controller use synchronous demodulation techniques, undesired external noise can cause a beat note between the drive frequency of the controller and the external noise frequency, or can induce harmonics of the fundamental noise frequency. Liquid crystal displays (LCDs) and switched-mode power supplies (SMPSs) are often used in conjunction with capacitive touchscreen 90. LCDs are typically located only a short distance away from touchscreen 90, and can act as sources of undesired noise. SMPSs can also as sources of undesired noise. For example, many external LCD noise sources generate square or pseudo-square waves in the 1 to 30 KHz range. Harmonics of the noise LCDs, SMPSs and other devices generate that are located near the drive frequency of touchscreen 90 can cause interference, which in turn can lead to erroneous touch reports to host controller 120. Erroneous touch reports can include falsely reporting that fingers are in contact with the touchscreen 90 when they are not, reporting the wrong x,y coordinates of a touch on touchscreen 90 instead of the correct locations of fingers in contact with touchscreen 90, and falsely reporting that fingers have been lifted off touchscreen 90 when in fact they are still in contact therewith.

What is needed are devices and methods for reducing the amount of undesired interference between undesired external noise signals and the drive signals provided to a capacitive touchscreen.

SUMMARY

In one embodiment, there is provided a method of reducing interference between a first noise signal, and drive and sense signals, in a capacitive touchscreen system comprising a capacitive touchscreen and a touchscreen controller operably connected to the touchscreen and configured to provide the drive signals thereto and to receive the sense signals therefrom, the capacitive touchscreen comprising drive electrodes configured to provide the drive signals and sense electrodes configured to receive the sense signals, mutual capacitances existing between the drive and sense electrodes at locations where the drive and sense electrodes intersect, such mutual capacitances changing in the presence of one or more fingers or touch devices brought into proximity thereto, the method comprising receiving, in the touchscreen controller as an input thereto, a second noise signal related to the first noise signal, the second noise signal being generated by a device external to the capacitive touchscreen, determining, in the touchscreen controller, an initial fundamental frequency and at least one initial harmonic frequency of the first noise signal, adjusting, in the touchscreen controller, the frequency of the drive signal to an initial adjusted drive signal frequency that is between about 10% greater than the fundamental frequency and about 10% less than the harmonic frequency, determining, in the touchscreen controller, an updated fundamental frequency and an updated at least one initial harmonic frequency of the first noise signal, and adjusting, in the touchscreen controller, the initial adjusted frequency of the drive signal to an updated adjusted drive signal frequency that is between about 10% greater than the updated fundamental frequency and about 10% less than the updated harmonic frequency.

In yet another embodiment, there is provided a method of reducing interference between a first noise signal, and capacitive touchscreen drive and sense signals, in a capacitive touchscreen system comprising a capacitive touchscreen and a touchscreen controller operably connected to the touchscreen and configured to provide the drive signals thereto and to receive the sense signals therefrom, the capacitive touchscreen comprising drive electrodes configured to provide the drive signals and sense electrodes configured to receive the sense signals, mutual capacitances existing between the drive and sense electrodes at locations where the drive and sense electrodes intersect, such mutual capacitances changing in the presence of one or more fingers or touch devices brought into proximity thereto, the method comprising receiving, in the touchscreen controller as an input thereto, a second noise signal related to the first noise signal, the second signal being generated by a device external to the capacitive touchscreen, determining, in the touchscreen controller, an initial fundamental frequency $f_{fundamental,noise}$ of the first noise signal, adjusting, in the touchscreen controller, the frequency of the drive signal to an initial adjusted drive signal frequency that is about $(n+k_{noise}) \times (f_{fundamental,noise}$ initial$)$, where n is an integer, determining, in the touchscreen controller, an updated fundamental frequency $f_{fundamental,noise}$ updated and adjusting, in the touchscreen controller, the initial adjusted frequency of the drive signal to an updated adjusted drive signal frequency that is about $(n+k_{noise}) \times (f_{fundamental,noise}$ updated$)$, where n is an integer.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
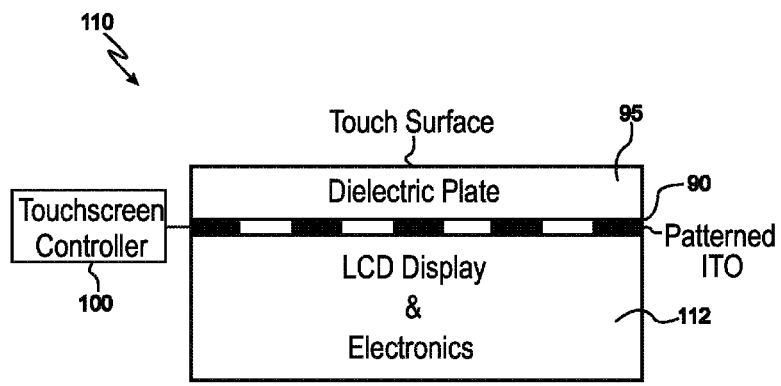
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
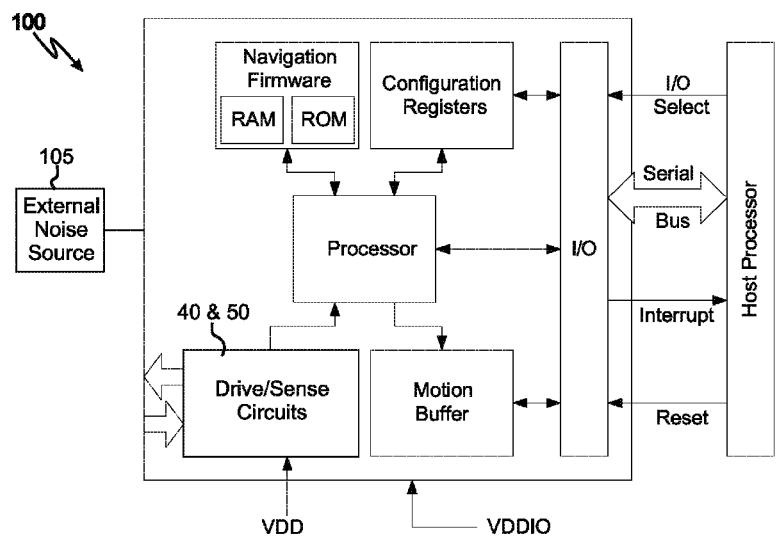
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or similar chip 100 modified in accordance with the teachings presented herein. In one embodiment, touchscreen controller is a low-power capacitive touch-panel controller designed to provide a touchscreen system with high-accuracy, on-screen navigation.

Touchscreen controller 100 may be configured to receive noise signals directly from external noise source 105 as an input thereto, more about which is said below. Alternatively, such noise signals can be provided to touchscreen controller 100 through intervening circuitry. Examples of external noise source 105 include, but are not limited to, an LCD or SMPS.

Figure 3:
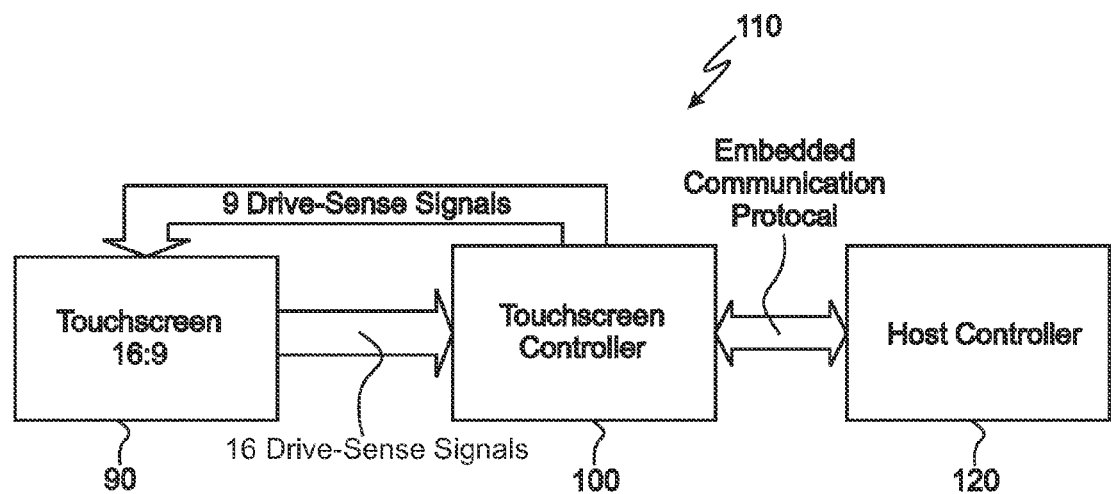
FIG. 3 shows one embodiment of a block diagram of a capacitive touchscreen system and a host controller.
Figure 4:
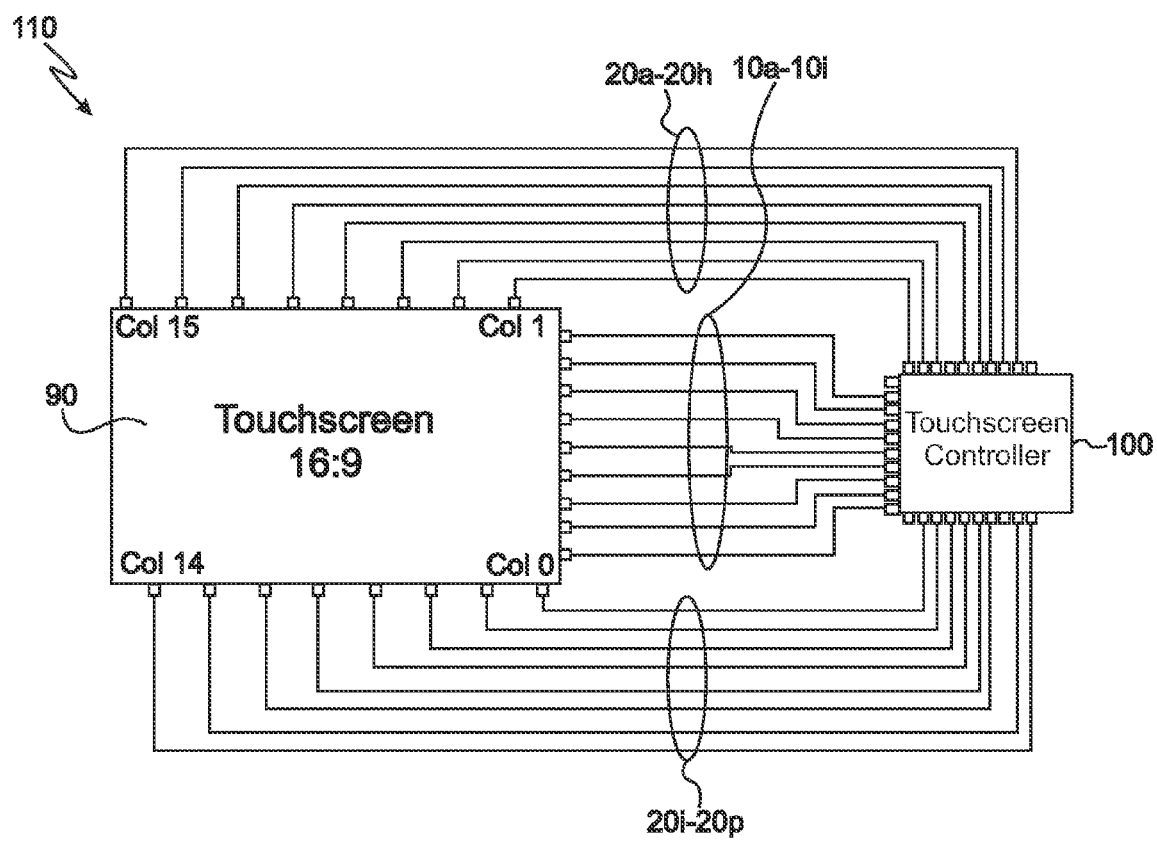
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid couples charge from the device to sense electrodes, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, mobile telephones, smart phones, portable media players, mobile internet devices (MIDs), and GPS devices.

Referring now to FIGS. 3 and 4, in one embodiment the touchscreen controller 100 includes an analog front end with 9 sense (or drive) and 16 drive (or sense) signal lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 can feature multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 may automatically shift to the next-lowest power consumption mode. However, as power consumption is reduced the response time to touches typically increases.

According to one embodiment, and as shown in FIG. 4, an ITO grid on the touchscreen 90 comprises rows 20a-20p (or Y lines 1-16) and columns 10a-10i (or X lines 1-9), where rows 20a-20p are operably connected to drive circuits 40 and columns 10a-10i are operably connected to sense circuits 50. One configuration for routing ITO drive and sense lines to touchscreen controller 100 is shown in FIG. 4.

Note that the rows in a touchscreen may be configured to operate as sense lines, and the columns in a touchscreen may be configured to operate as drive lines. Drive lines may also be selectably switched to operate as sense lines, and sense lines may be selectably switched to operate as drive lines under the control of appropriate multiplexing and control circuitry. Moreover, drive and sense lines may be configured in patterns other than rows and columns, or other than orthogonal rows and columns. Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

In one embodiment, the angle between traces 10 and 20 is about 90 degrees (as shown, for example in FIG. 4), but may be any suitable angle such as, by way of example, about 15 degrees, about 30 degrees, about 45 degrees, about 60 degrees, or about 75 degrees. Electrically conductive traces 10 and 20 may be disposed in substantially parallel but vertically-offset first and second planes, respectively, or may be disposed in substantially the same plane. In one embodiment, electrically conductive traces 10 and 20 comprise indium tin oxide ("ITO"), or any other suitable electrically conductive material. A liquid crystal display may be disposed beneath electrically conductive traces 10 and 20, or any other suitable image display. Electrically conductive traces 10 and 20 are preferably disposed on a substrate comprising an electrically insulative material that is substantially optically transparent.

Note that touchscreen system 110 may be incorporated into or form a portion of an LCD, a computer display, a computer, a laptop computer, a notebook computer, an electronic book reader, a personal data assistant (PDA), a mobile telephone, a smart phone, an electronic book reader, a radio, an MP3 player, a portable music player, a stationary device, a television, a stereo, an exercise machine, an industrial control, a control panel, an outdoor control device, a household appliance, or any other suitable electronic device.

Figure 5:
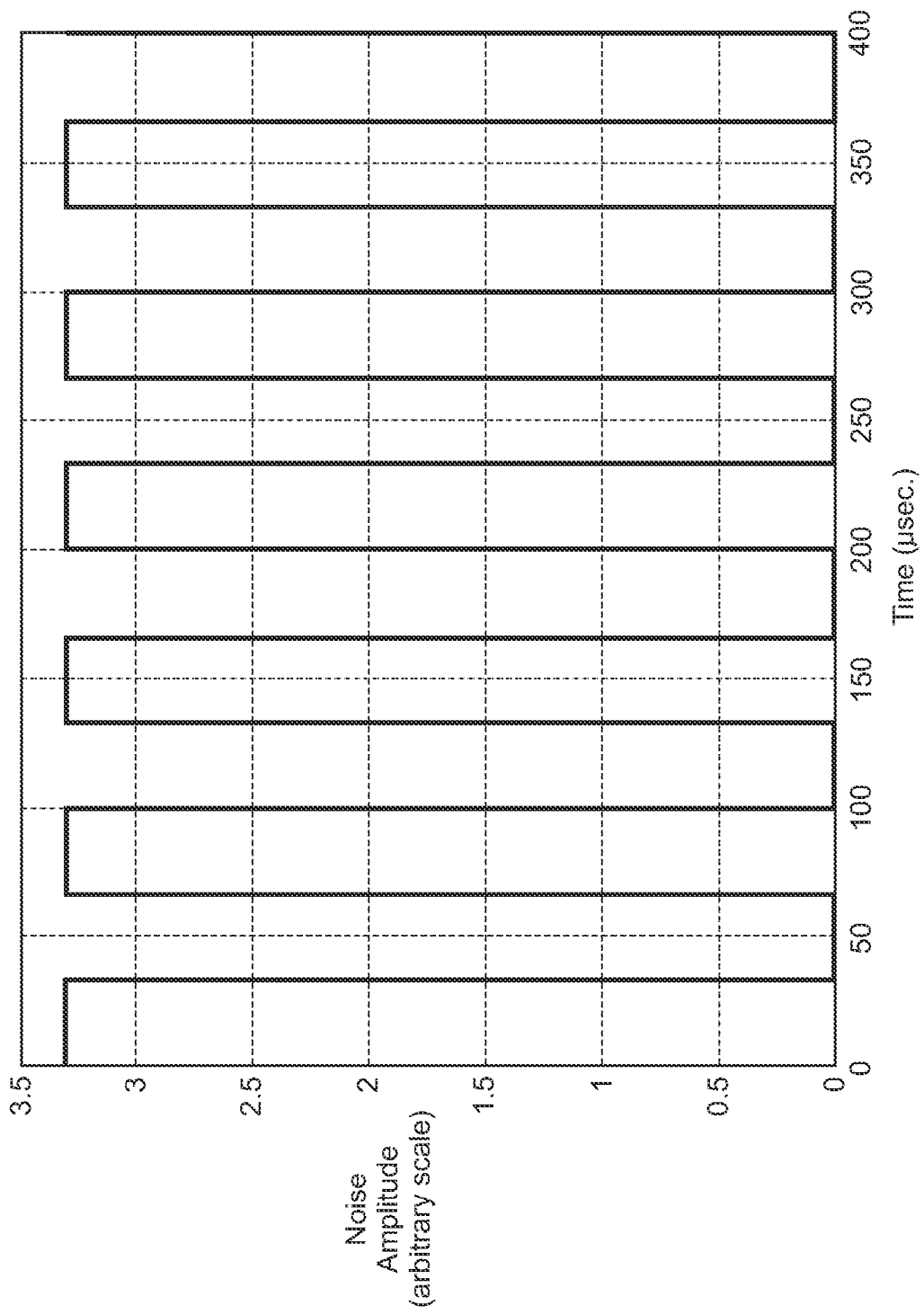
FIG. 5 shows an illustrative noise waveform from an LCD in the time domain.
Figure 6:
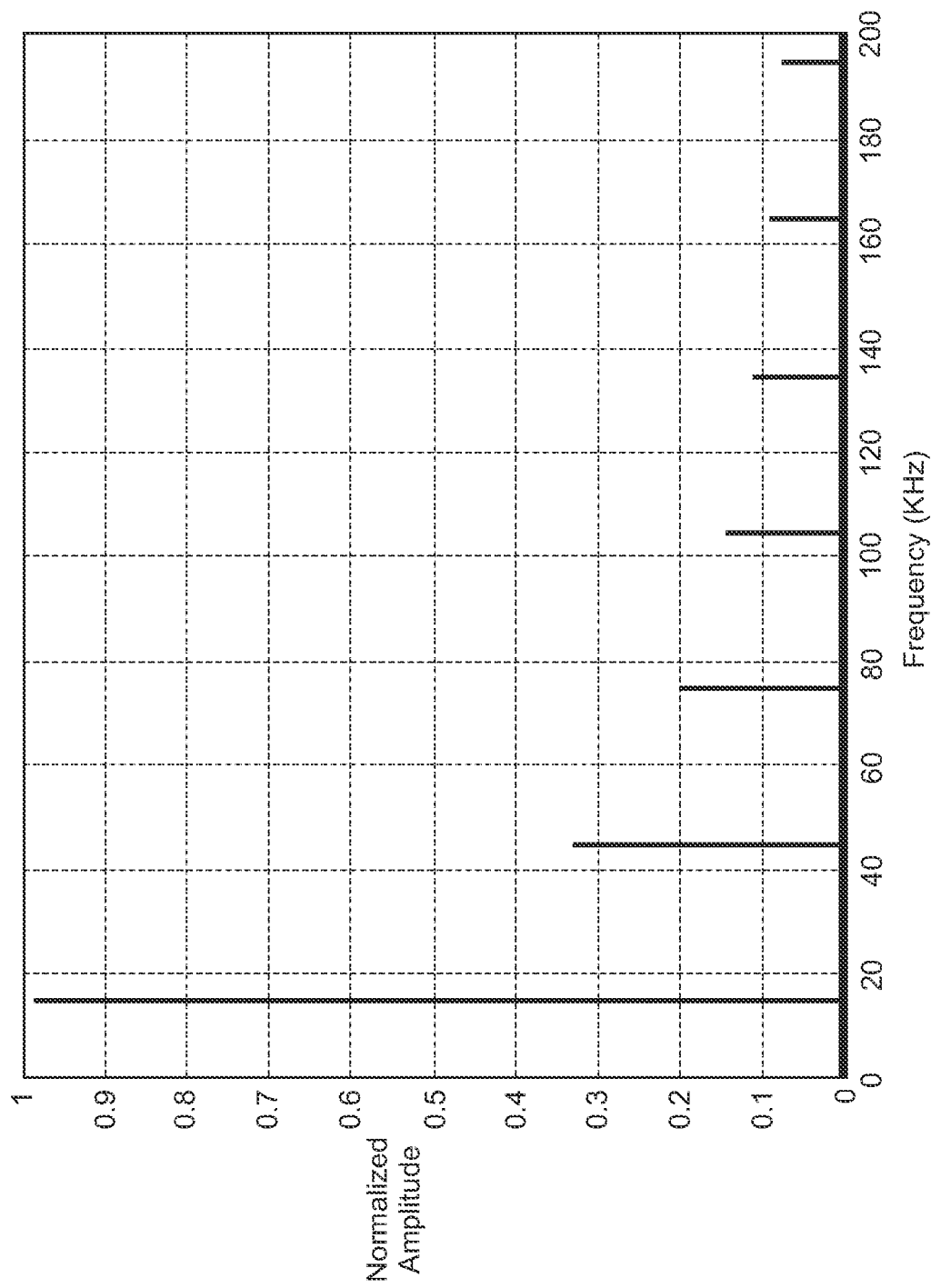
FIG. 6 shows the LCD waveform of FIG. 5 in the frequency domain.

FIG. 5 shows an example of an illustrative noise waveform from an LCD in the time domain. FIG. 6 shows the same waveform in the frequency domain. As will be seen by referring to FIGS. 5 and 6, the fundamental frequency of the noise (around 17 kHz) and the odd harmonics thereof have the highest amplitudes, and therefore provide the greatest potential for interference with the operation of capacitive touchscreen 90.

Figure 7:
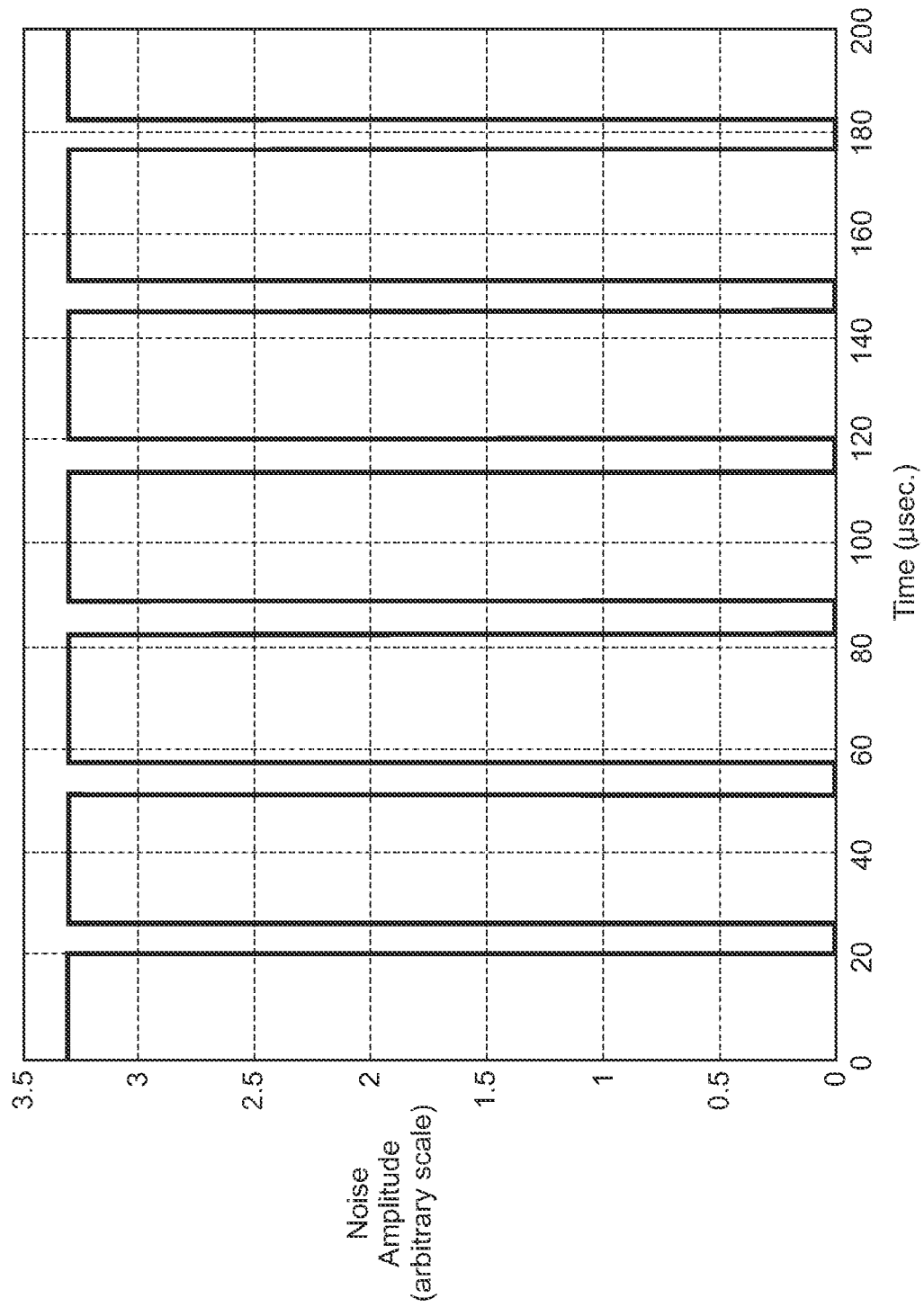
FIG. 7 shows an illustrative noise waveform from a switched-mode power supply.
Figure 8:
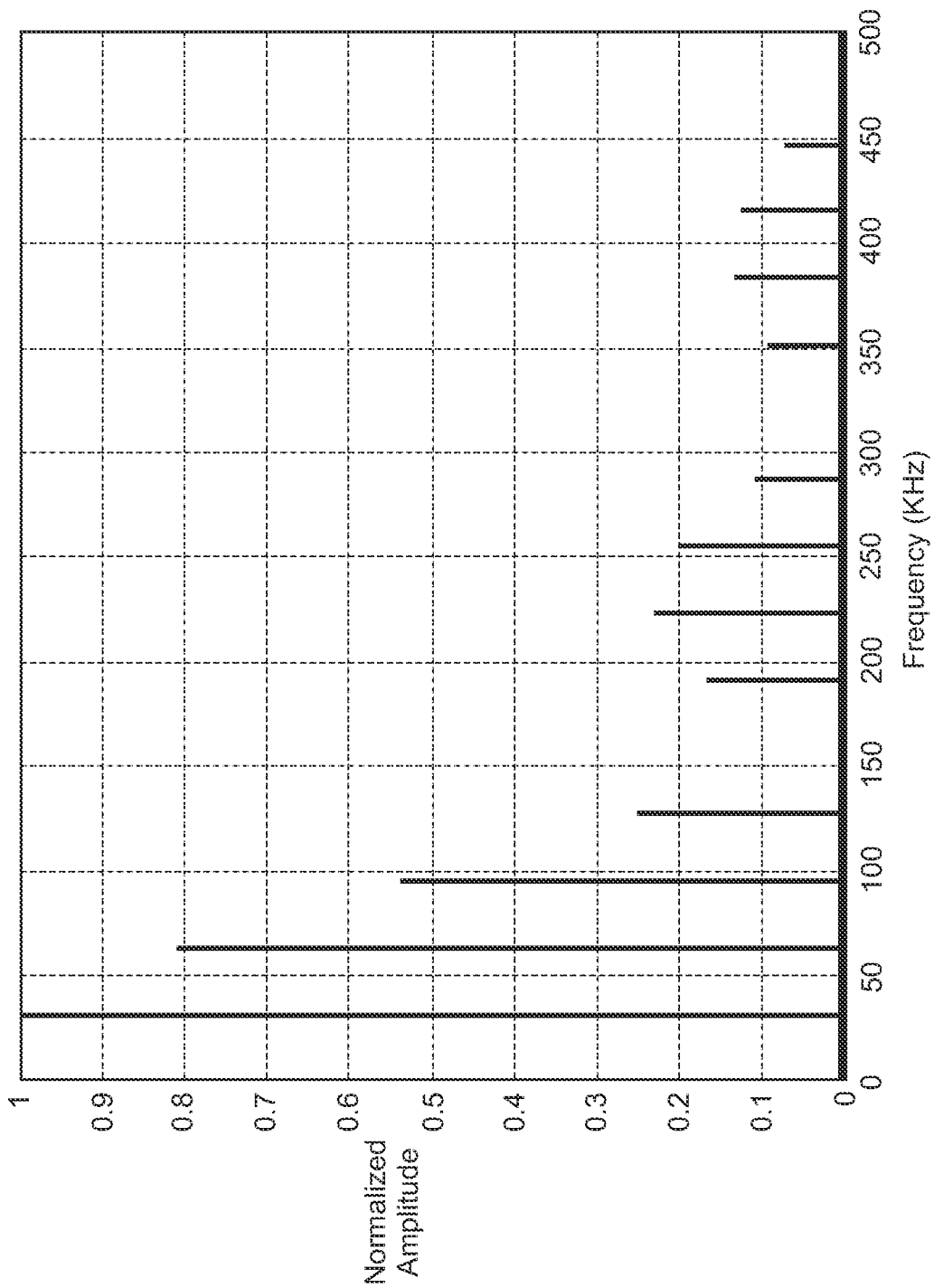
FIG. 8 shows the switched-mode power supply waveform of FIG. 7 in the frequency domain.

FIG. 7 shows another example of an illustrative noise waveform from a switched-mode power supply. FIG. 8 shows the same waveform in the frequency domain. Due to the fact that the noise waveform of FIG. 7 does not have a 50% duty cycle, both even and odd harmonics of the fundamental noise frequency of about 30 kHz are present and can interfere with the drive frequency of touchscreen 90.

By operating the drive and demodulation frequency of capacitive touch controller 100 at a frequency that lies between the harmonics of noise signals such as those shown in FIGS. 5 through 8, interference of such undesired external noise signals with the drive signals provided by touchscreen controller 100 can be minimized. In one embodiment, to adjust the drive frequency of touchscreen controller 100 so that it lies between the harmonics of such undesired external noise signals, second noise signals related to first noise signals (such as the horizontal or vertical synchronization signals of an LCD driver circuit or other source of undesired external noise) are provided to the capacitive touchscreen controller 100 as inputs. Touchscreen controller 100 then measures the frequencies of the second noise signals, and in one embodiment computes a touchscreen controller drive frequency that is neither an odd harmonic nor an even harmonic of the fundamental noise frequency of the first noise signal.

For example, consider the example of an LCD display having a 15 KHz fundamental noise frequency that comprises a square or pseudo-square wave having a 50% duty cycle. Strong interference from such an undesired external noise signal is expected near 15 kHz, 45 kHz, 75 kHz, 105 kHz, 135 kHz, 165K Hz and even higher harmonic frequencies. If the 15K Hz external noise signal originating from the LCD is provided to touchscreen controller 100, controller 100 can be configured to measure the frequencies of the external noise signal using internal timers to measure the frequencies of the external noise signal, and in accordance therewith to adjust the drive signal output to be, by way of example, (n+½) times the fundamental frequency of the undesired external noise signal, where n is an integer. In the foregoing example of the undesired external noise signal having a fundamental frequency of 15 kHz, a good choice would be for n=8, and $k_{noise}$=½ (or 0.5), thus setting the drive (and measurement) frequencies of touchscreen controller 100 to (8+½)*15 KHz=120.5 Khz. Since the LCD noise spectrum contains little or no energy at this frequency, a good signal-to-noise ratio may be achieved, even for external noise signals having large amplitudes.

The analog sense amplifiers of touchscreen controller 100 are best kept within a linear operating range (otherwise clipping can distort the amplifier waveforms, and cause suppression of the intended drive signals). Even in the case where the oscillator frequency of touchscreen controller 100 depends upon or varies with respect to temperature or supply voltage, an accurate frequency ratio of the drive and measurement signal frequencies relative to the noise fundamental and harmonic frequencies can be maintained. Any error in measuring the LCD synchronization signal's frequency can be offset by the same ratio of error in the drive signals provided by touchscreen controller 100.

In one embodiment, the frequencies of undesired external noise signals can also be measured without establishing a direct electrical connection between the source of the undesired external noise and a pin of touchscreen controller 100. For example, direct measurements of undesired external noise signal amplitude as a function of time can be acquired while drive signals are not being provided to touchscreen 90 by touchscreen controller 100, and a digital phase locked loop can lock the intended frequency of drive signals provided by touchscreen controller 100 to the external noise before each measurement burst. If the amplitude of the undesired external noise signals becomes sufficiently small, the prior locked frequency of the drive signals can be maintained.

In another embodiment, analog drive signals provided by touchscreen controller 100 during driving and synchronous demodulation can be analyzed by touchscreen controller 100 for periodic beat notes associated with undesired external noise. In response to such periodic beat notes being identified by touchscreen controller 100, the drive signals provided thereby can be frequency-shifted to drive the beat notes up and out of the drive signal passband.

In accordance with the foregoing teachings and disclosure, in one embodiment there is provided a method of reducing interference between a first noise signal, and drive and sense signals, in a capacitive touchscreen system. The system comprises a capacitive touchscreen and a touchscreen controller operably connected to the touchscreen and configured to provide the drive signals thereto and to receive the sense signals therefrom. The capacitive touchscreen comprises drive electrodes configured to provide the drive signals and sense electrodes configured to receive the sense signals, where mutual capacitances exist between the drive and sense electrodes at locations where the drive and sense electrodes intersect. The mutual capacitances change in the presence of one or more fingers or touch devices brought into proximity thereto. In the method, the touchscreen controller receives as an input thereto a second noise signal related to the first noise signal, the second noise signal being generated by a device external to the capacitive touchscreen, followed by determining, in the touchscreen controller, an initial fundamental frequency and at least one initial harmonic frequency of the first noise signal; adjusting, in the touchscreen controller, the frequency of the drive signal to an initial adjusted drive signal frequency that is between about 10% greater than the fundamental frequency and about 10% less than the harmonic frequency; determining, in the touchscreen controller, an updated fundamental frequency and an updated at least one initial harmonic frequency of the first noise signal, and adjusting, in the touchscreen controller, the initial adjusted frequency of the drive signal to an updated adjusted drive signal frequency that is between about 10% greater than the updated fundamental frequency and about 10% less than the updated harmonic frequency.

In the foregoing method, the initial adjusted drive signal frequency may range between about 20% greater than the fundamental frequency and about 20% less than the harmonic frequency, between about 30% greater than the fundamental frequency and about 30% less than the harmonic frequency, between about 40% greater than the fundamental frequency and about 40% less than the harmonic frequency, or between about 50% greater than the fundamental frequency and about 50% less than the harmonic frequency.

Further in accordance with the foregoing teachings and disclosure, in another embodiment there is provided a method of reducing interference between a first noise signal, and capacitive touchscreen drive and sense signals, in a capacitive touchscreen system. The system comprises a capacitive touchscreen and a touchscreen controller operably connected to the touchscreen and configured to provide the drive signals thereto and to receive the sense signals therefrom. The capacitive touchscreen comprises drive electrodes configured to provide the drive signals and sense electrodes configured to receive the sense signals. Mutual capacitances exist between the drive and sense electrodes at locations where the drive and sense electrodes intersect, such mutual capacitances changing in the presence of one or more fingers or touch devices brought into proximity thereto. The method comprises receiving, in the touchscreen controller as an input thereto, a second noise signal related to the first noise signal, the second noise signal being generated by a device external to the capacitive touchscreen; determining, in the touchscreen controller, an initial fundamental frequency $f_{fundamental,noise}$ of the first noise signal; adjusting, in the touchscreen controller, the frequency of the drive signal to an initial adjusted drive signal frequency that is about $(n+k_{noise}) \times (f_{fundamental,noise}$ initial), where n is an integer; determining, in the touchscreen controller, an updated fundamental frequency $f_{fundamental,noise}$ updated, and adjusting, in the touchscreen controller, the initial adjusted frequency of the drive signal to an updated adjusted drive signal frequency that is about $(n+k_{noise}) \times (f_{fundamental,noise}$ updated), where n is an integer. $k_{noise}$ is a constant value can be set as any value, which will be described for more detail later.

In the foregoing method, $k_{noise}$ may range between about 0.001 and about 0.999; between about 0.01 and about 0.99; between about 0.1 and about 0.9; or between about 0.5 and about 0.9. Additionally, $k_{noise}$ may be selected from the group consisting of about 1/8, about 1/4, about 1/3, about 3/8, about 1/2, about 5/8, about 2/3, about 3/4, about 7/8, about 13/16, about 15/19, about 21/25, about 33/43, and about 49/57. $k_{noise}$ may also comprise a first odd integer as a denominator thereof, and a second odd integer as a denominator thereof, where, by way of example, the first odd integer is greater than 11 and the second odd integer is greater than 13. Other fractions and values for $k_{noise}$ are also contemplated.

Figure 9:
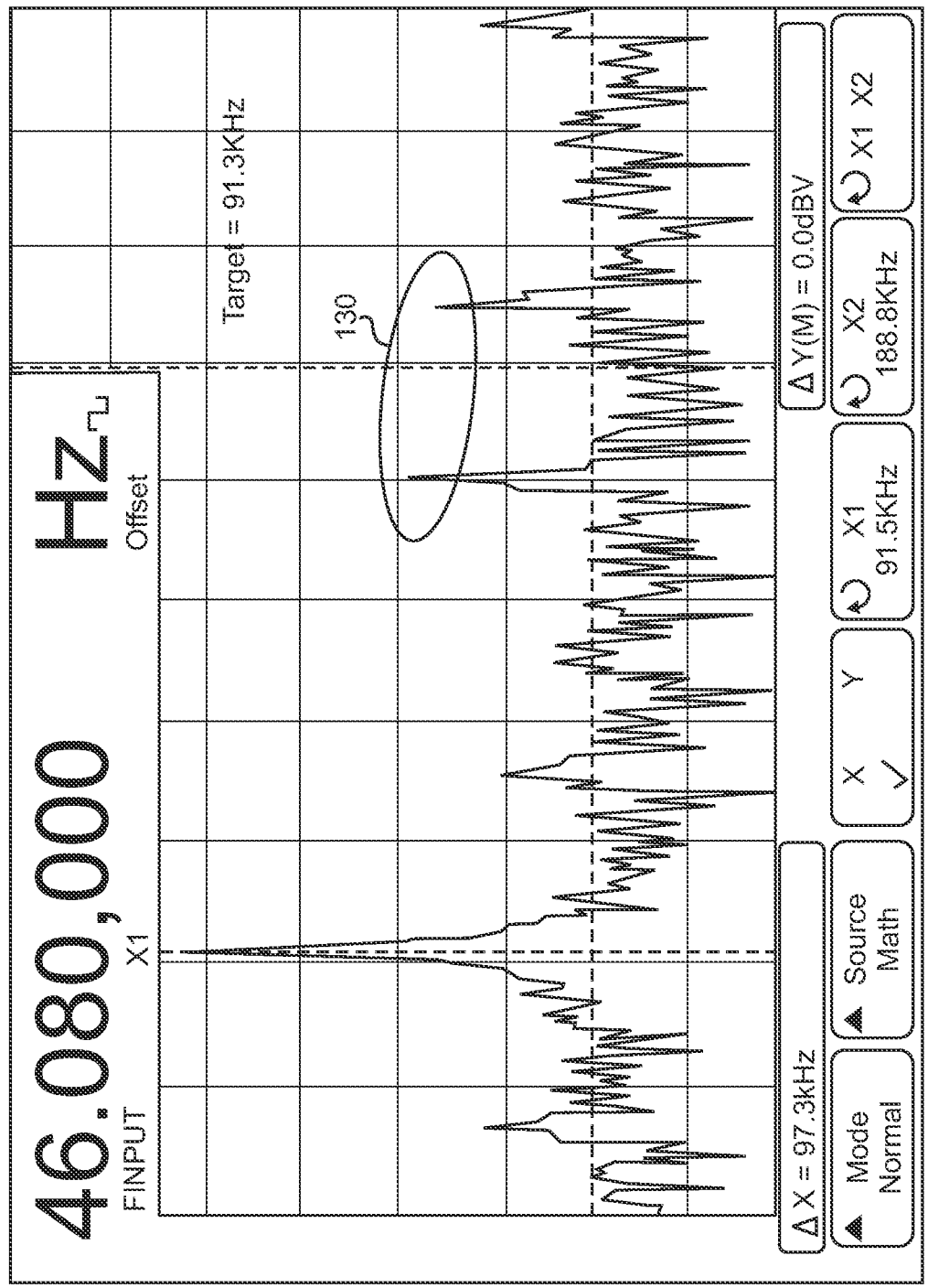
FIG. 9 shows results obtained using a touchscreen controller configured to reduce noise interference in drive signals provided thereby in the presence of external noise signals having first characteristics provided by a simulated external LCD.
Figure 10:
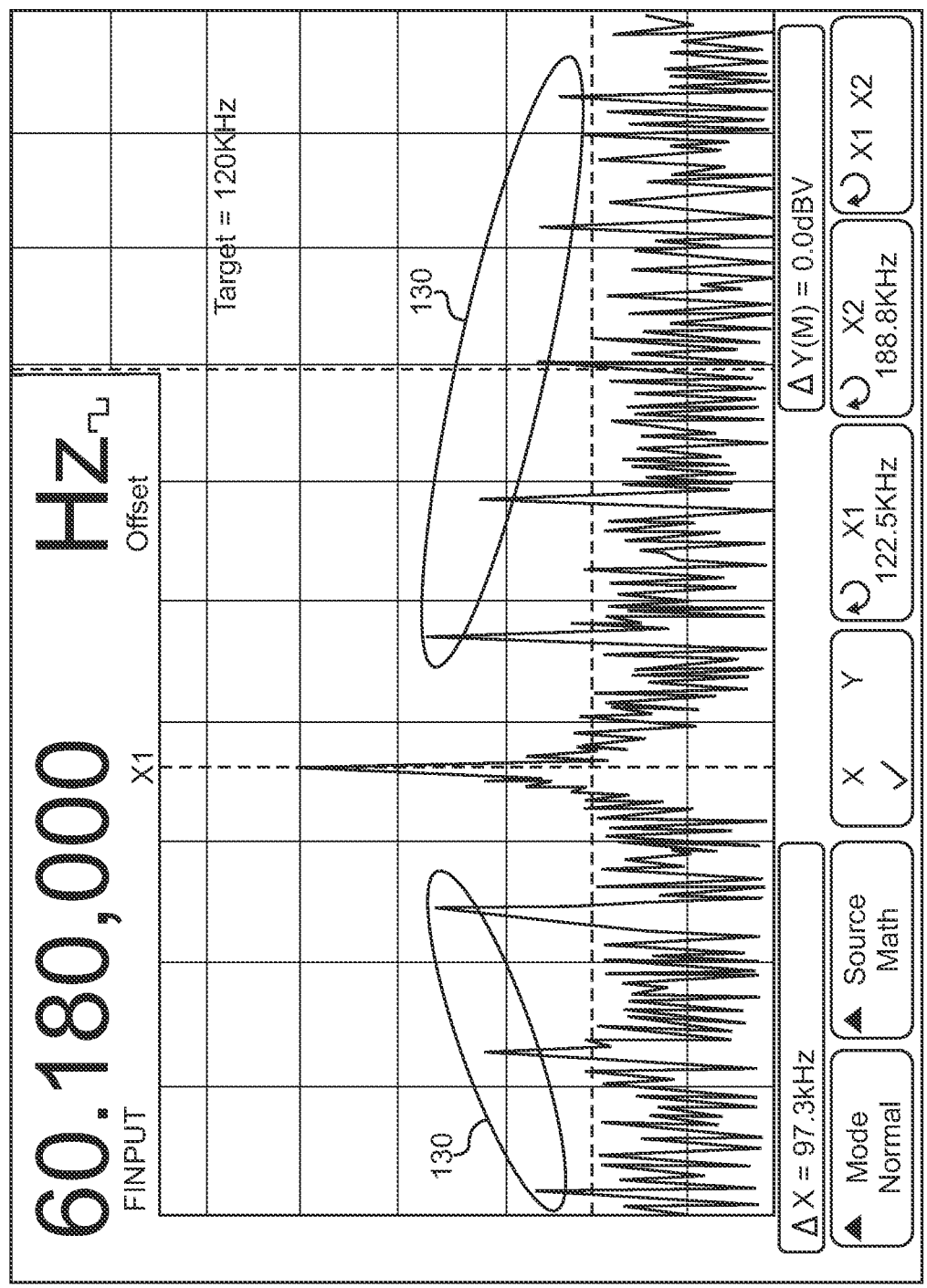
FIG. 10 shows results obtained using a touchscreen controller configured to reduce noise interference in drive signals provided thereby in the presence of external noise signals having second characteristics provided by a simulated external LCD.
Figure 11:
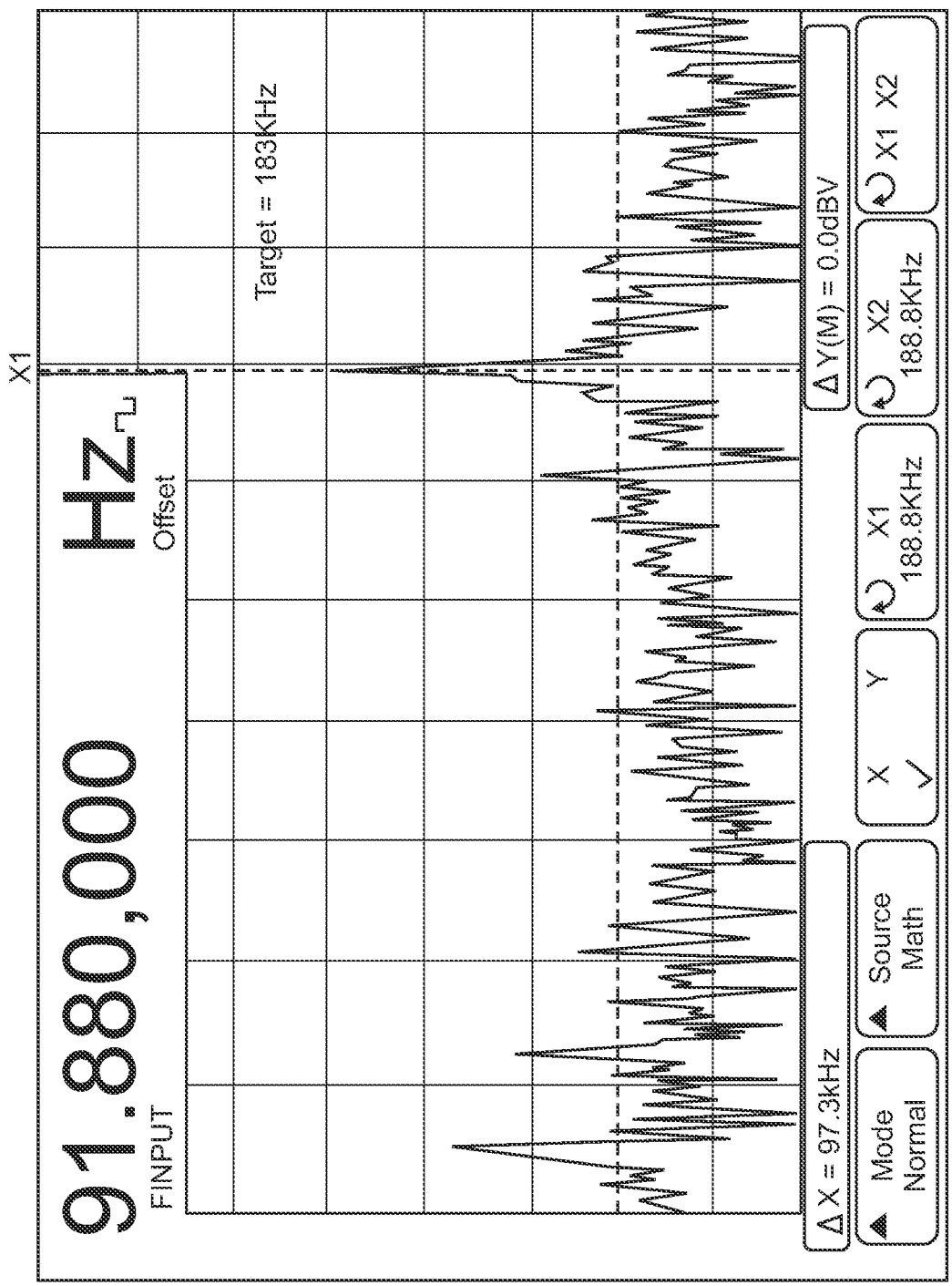
FIG. 11 shows results obtained using a touchscreen controller configured to reduce noise interference in drive signals provided thereby in the presence of external noise signals having third characteristics provided by a simulated external LCD.
Figure 12:
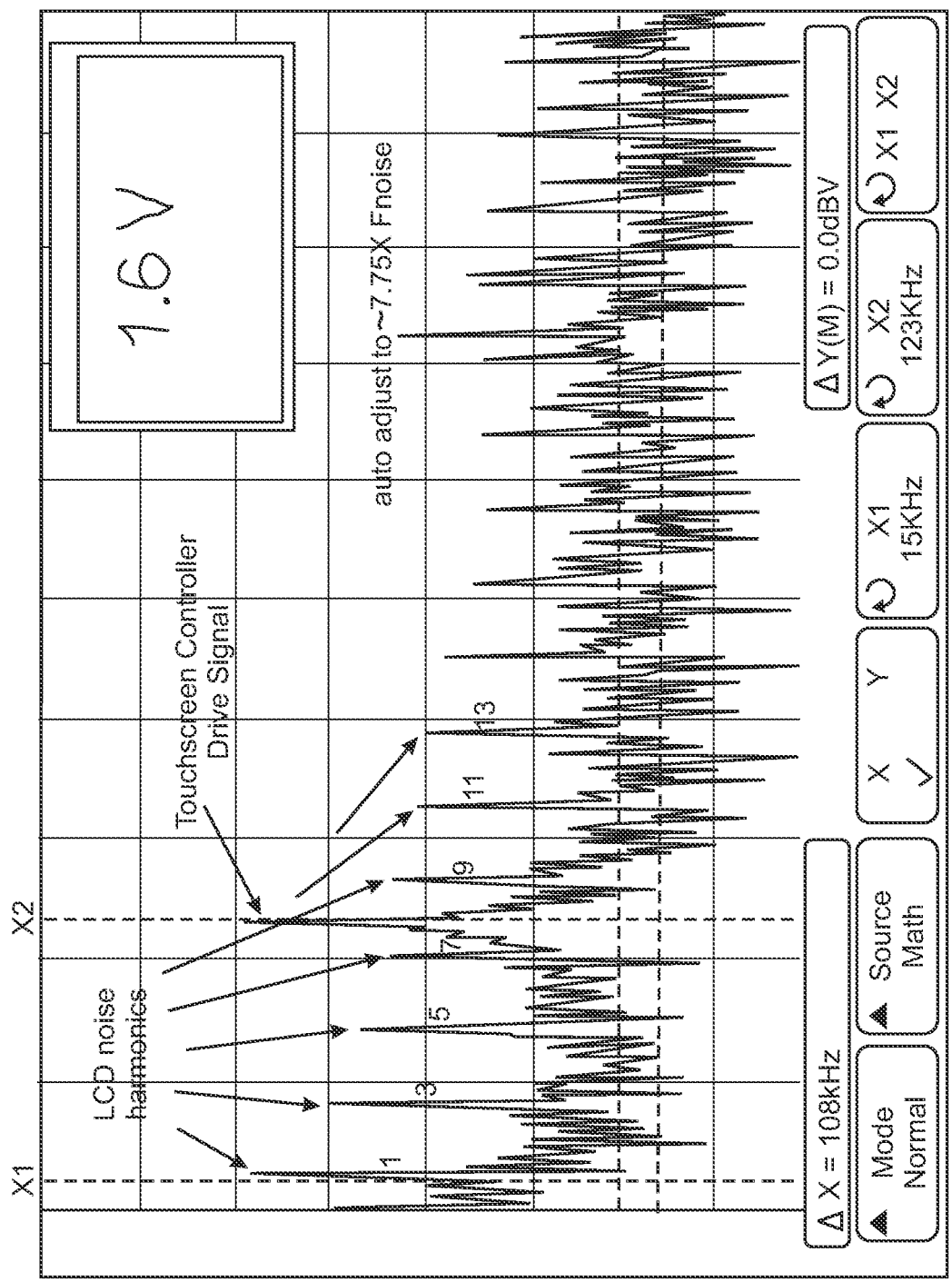
FIG. 12 shows results obtained using a touchscreen controller configured to reduce noise interference in drive signals provided thereby in the presence of external noise signals having first characteristics provided by a simulated external LCD, where the supply voltage provided to the touchscreen controller is about 1.6 volts.
Figure 13:
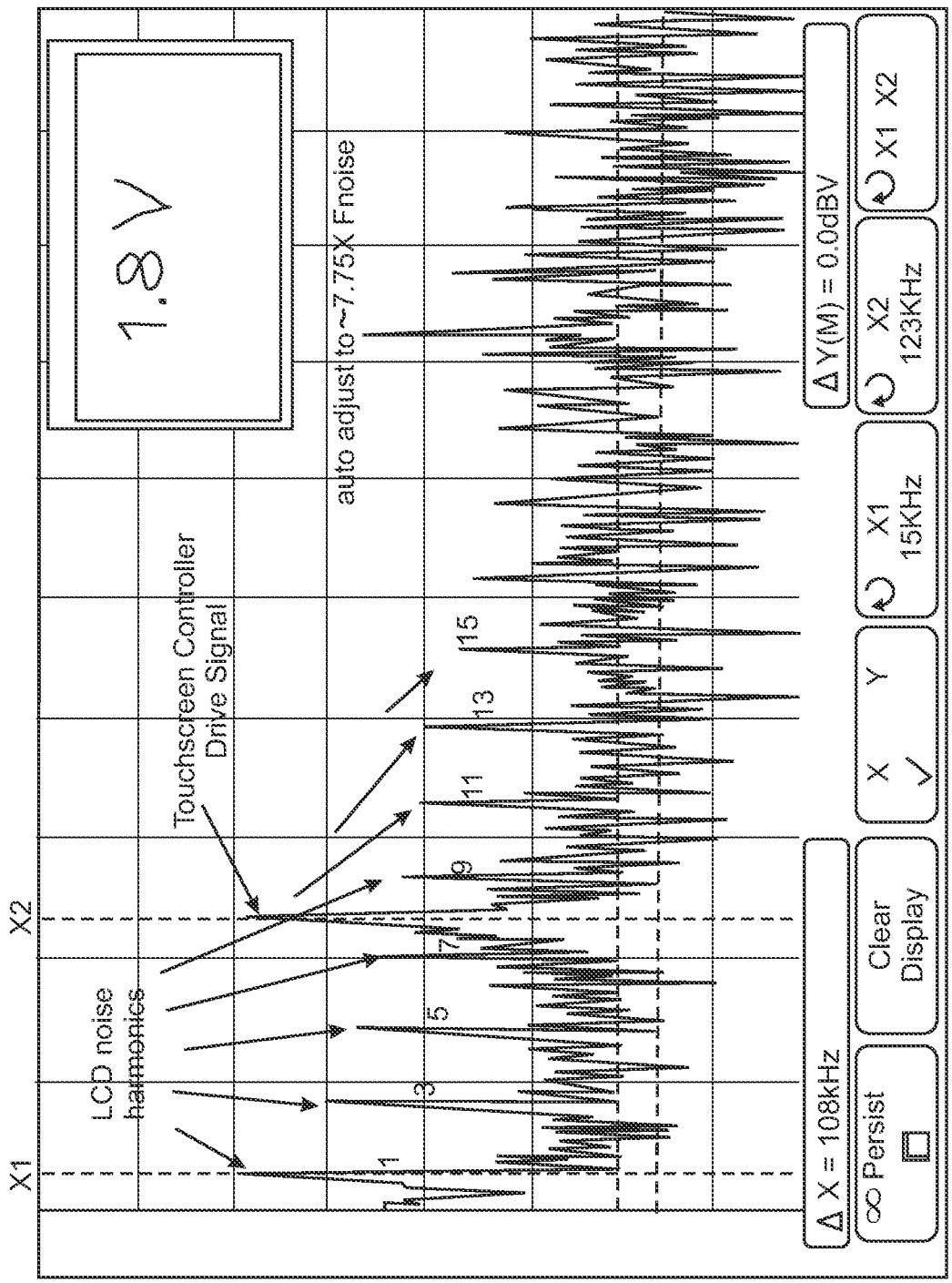
FIG. 13 shows results obtained using a touchscreen controller configured to reduce noise interference in drive signals provided thereby in the presence of external noise signals having first characteristics provided by a simulated external LCD, where the supply voltage provided to the touchscreen controller is about 1.8 volts.
Figure 14:
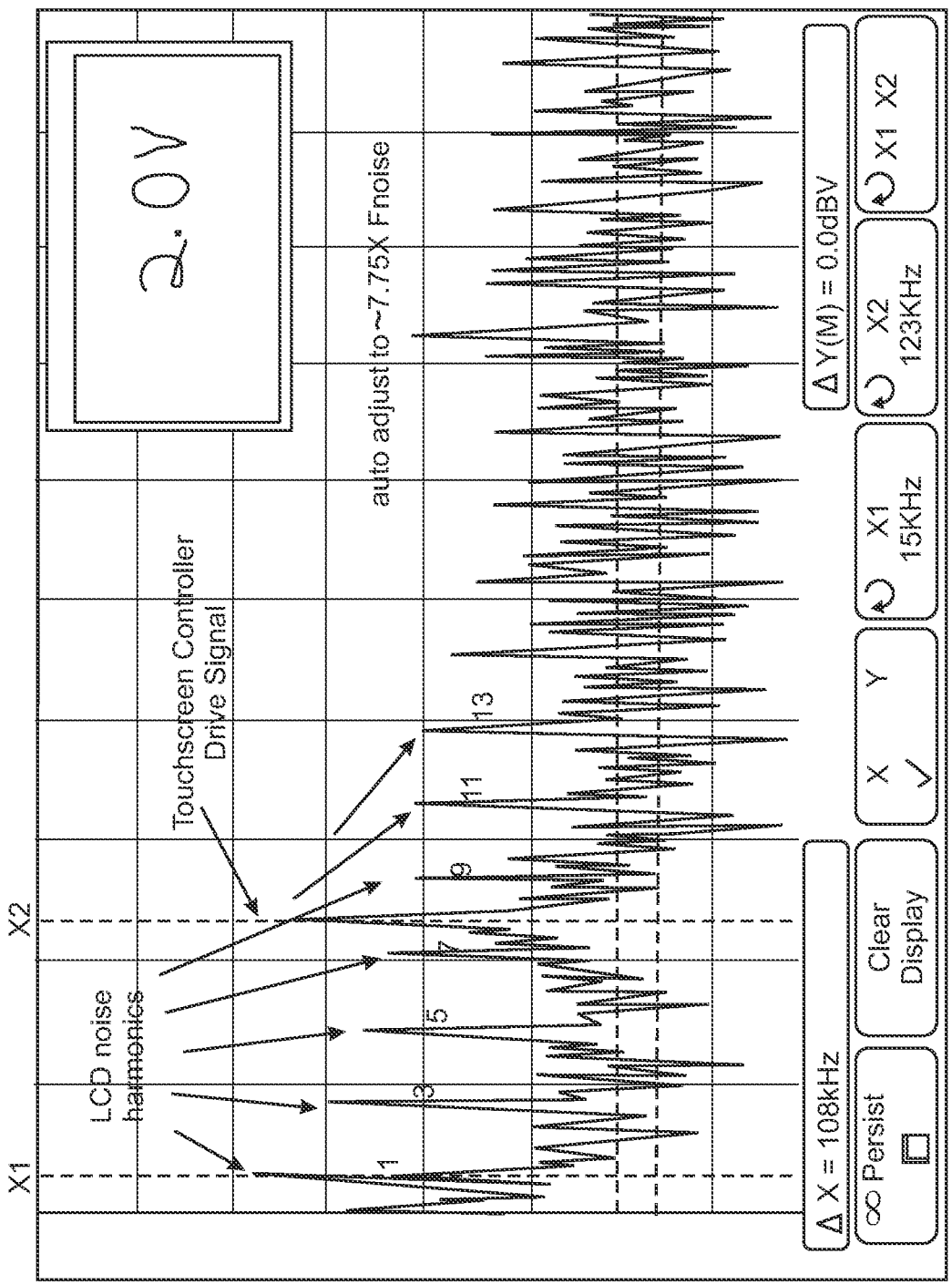
FIG. 14 shows results obtained using a touchscreen controller configured to reduce noise interference in drive signals provided thereby in the presence of external noise signals having first characteristics provided by a simulated external LCD, where the supply voltage provided to the touchscreen controller is about 1.6 volts.

Referring now to FIGS. 9 through 14, there are shown results obtained using an Avago AMRI-5000 touchscreen controller 100 programmed and configured to reduce noise interference in drive signals provided thereby in the presence of external noise signals provided by an external signal generator, where the noise signals were configured to simulate the noise signals generated by an external LCD. Touchscreen controller 100 was programmed and configured in accordance with the foregoing teachings to measure and quantify the noise signals, and to automatically select drive frequencies that would avoid or lie between the otherwise interfering noise signals. FIGS. 9 through 14 are reproductions of frequency domain displays appearing on an Agilent 54641D oscilloscope. In FIGS. 9 through 11, the frequencies of the external noise signals were varied, and the response of touchscreen controller 100 measured by the oscilloscope. In FIGS. 12 through 14, the supply voltages provided to touchscreen controller 100 were varied while the frequency of the external noise signal was held relatively constant, and the response of touchscreen controller 100 measured by the oscilloscope.

FIG. 9 shows results obtained using a touchscreen controller configured to reduce noise interference in drive signals provided thereby in the presence of external noise signals having first characteristics provided by a simulated external LCD. In FIG. 9, the signal generator had a frequency of 46.08 Hz, which was selected to mimic the characteristics of a particular LCD product. Further characteristics of the LCD product were also determined and plugged into the above-presented formula $(n+k_{noise}) \times (f_{fundamental,noise}$ initial), where n was equal to 7, $k_{noise}$ was set at 3/4 (or 0.75), and $(f_{fundamental,noise}$ initial) was set at 46.08×257 to yield a target drive frequency in touchscreen controller 100 of 91.3 kHz. The number 257 was arrived at by considering the number of pixels along one axis in the LCD product driven at the refresh rate (240 pixels) plus the number 17 to take into account additional operations carried out by the LCD controller of the LCD product.

Continuing to refer to FIG. 9, it will be seen that the frequency of the drive signal measured on the oscilloscope and implemented by touchscreen controller 100 (91.5 kHz) differs from the target frequency calculated by the touchscreen controller (91.3 kHz). This is because the touchscreen controller employed could not choose simply any frequency for the adjusted drive frequency, but instead was limited to selecting a frequency close to the target frequency. FIG. 9 further shows that the adjusted-frequency drive signals provided by touchscreen controller 100 in response to the simulated external LCD noise signals lie in a region of the frequency spectrum where the noise signals do not interfere with the drive signals.

Note that the two large peaks 130 in FIG. 9 to the far right of the drive signal occurring at 91.3 MHz are unintended false harmonics arising from aliasing as a result of the test instrumentation set-up that was employed. Similar false harmonics 130 arising from aliasing as a result of the test instrumentation set-up also appear in FIGS. 10 and 11.

FIG. 10 shows results obtained using a touchscreen controller configured to reduce noise interference in drive signals provided thereby in the presence of external noise signals having second characteristics provided by a simulated external LCD. In FIG. 10, signal generator had a frequency of 60.18 Hz, which was also selected to mimic the characteristics of the LCD product mentioned above. Further characteristics of the LCD product were also determined and plugged into the above-presented formula $(n+k_{noise}) \times (f_{fundamental,noise}$ initial), where n was equal to 7, $k_{noise}$ was set at 3/4 (or 0.75), and $(f_{fundamental,noise}$ initial) was set at 60.18×257 to yield a target drive frequency in touchscreen controller 100 of 120 kHz. The number 257 was arrived at by considering the number of pixels along one axis in the LCD product driven at the refresh rate (240 pixels) plus the number 17 to take into account additional operations carried out by the LCD controller of the LCD product.

Continuing to refer to FIG. 10, it will be seen that the frequency of the drive signal measured on the oscilloscope and implemented by touchscreen controller 100 (122.5 kHz) differs from the target frequency calculated by the touchscreen controller (120 kHz). This is because the touchscreen controller employed could not simply choose any frequency for the adjusted drive frequency, but instead was limited to selecting a frequency close to the target frequency. FIG. 10 further shows that the adjusted-frequency drive signals provided by touchscreen controller 100 in response to the simulated external LCD noise signals lie in a region of the frequency spectrum where the noise signals do not interfere with the drive signals.

FIG. 11 shows results obtained using a touchscreen controller configured to reduce noise interference in drive signals provided thereby in the presence of external noise signals having third characteristics provided by a simulated external LCD. In FIG. 11, the signal generator had a frequency of 91.88 Hz, which was also selected to mimic the characteristics of the LCD product mentioned above. Further characteristics of the LCD product were also determined and plugged into the above-presented formula $(n+k_{noise}) \times (f_{fundamental,noise}$ initial), where n was equal to 7, $k_{noise}$ was set at 3/4 (or 0.75), and $(f_{fundamental,noise}$ initial) was set at 91.88×257 to yield a target drive frequency in touchscreen controller 100 of 183 kHz. The number 257 was arrived at by considering the number of pixels along one axis in the LCD product driven at the refresh rate (240 pixels) plus the number 17 to take into account additional operations carried out by the LCD controller of the LCD product.

Continuing to refer to FIG. 11, it will be seen that the frequency of the drive signal measured on the oscilloscope and implemented by touchscreen controller 100 (188.5 kHz) differs from the target frequency calculated by the touchscreen controller (183 kHz). Again, this is because the touchscreen controller employed could not simply choose any frequency for the adjusted drive frequency, but instead was limited to selecting a frequency close to the target frequency. FIG. 11 further shows that the adjusted-frequency drive signals provided by touchscreen controller 100 in response to the simulated external LCD noise signals lie in a region of the frequency spectrum where the noise signals do not interfere with the drive signals.

Referring now to FIGS. 12 through 14, there are shown results obtained using a touchscreen controller configured to reduce noise interference in drive signals provided thereby in the presence of external noise signals having the same characteristics, but where the supply voltage provided to the touchscreen controller was varied. In FIG. 12, the supply voltage provided to touchscreen controller 100 was 1.6 volts. In FIG. 13, the supply voltage provided to touchscreen controller 100 was a nominal 1.8 volts. In FIG. 14, the supply voltage provided to touchscreen controller 100 was 2.0 volts.

In an AMRI-5000 ASIC, the nominal clock frequency is 24 MHz. Changes to the supply voltage provided to AMRI-5000 ASIC can affect the clock frequency substantially, and therefore the frequency of the drive signals provided thereby. For example, while the nominal clock frequency of the AMRI-5000 ASIC operating with a supply voltage of 1.8 volts is 24 MHz (FIG. 13), the clock frequency of the AMRI-5000 ASIC operating with a supply voltage of 1.6 volts was measured at 18.24 MHz in FIG. 13, and the clock frequency of the AMRI-5000 ASIC operating with a supply voltage of 2.0 volts was measured at 24.4 MHz in FIG. 14. Note that the measured clock frequency of 18.24 MHz of FIG. 13 differs from the nominal 24 MHz clock frequency by 24%, which represents a significant departure from the nominal clock frequency of the AMRI-5000 ASIC.

Continuing to refer to FIGS. 12 through 14, the external noise signals provided by the signal generator had a frequency of 60.18 Hz, which was selected to mimic the characteristics of the LCD product mentioned above. Further characteristics of the LCD product were also determined and plugged into the above-presented formula $(n+k_{noise}) \times (f_{fundamental,noise}$ initial), where n was equal to 7, $k_{noise}$ was set at ¾ (or 0.75), and ($f_{fundamental,noise}$ initial) was set at 60.18×257 to yield a target drive frequency in touchscreen controller 100 of 120 kHz. The number 257 was arrived at by considering the number of pixels along one axis in the LCD product driven at the refresh rate (240 pixels) plus the number 17 to take into account additional operations carried out by the LCD controller of the LCD product.

Continuing to refer to FIGS. 12 through 14, it will be seen that the frequencies of the drive signals measured on the oscilloscope and implemented by touchscreen controller 100 (about 123 kHz) differs from the target frequency calculated by the touchscreen controller (125 kHz). As above. this is because the touchscreen controller employed could not simply choose any frequency for the adjusted drive frequency, but instead was limited to selecting a frequency close to the target frequency. FIGS. 12 through 14 further show that the adjusted-frequency drive signals provided by touchscreen controller 100 in response to the simulated external LCD noise signals, despite significant variations in the supply voltages provided to touchscreen controller 100, lie in regions of the frequency spectrum where the noise signals do not interfere with the drive signals. As will also be seen by referring to FIGS. 12, 13 and 14, LCD noise harmonics appear throughout the measured frequency spectra, and are not of inconsiderable amplitude relative to the 123 kHz drive signals.

In accordance with above teachings and descriptions, FIGS. 9 through 14 demonstrate that touchscreen controller 100 may be programmed and configured successfully to automatically adjust the frequencies of the drive signals provided thereby to minimize or avoid interference with external noise signals.

Figure 15:
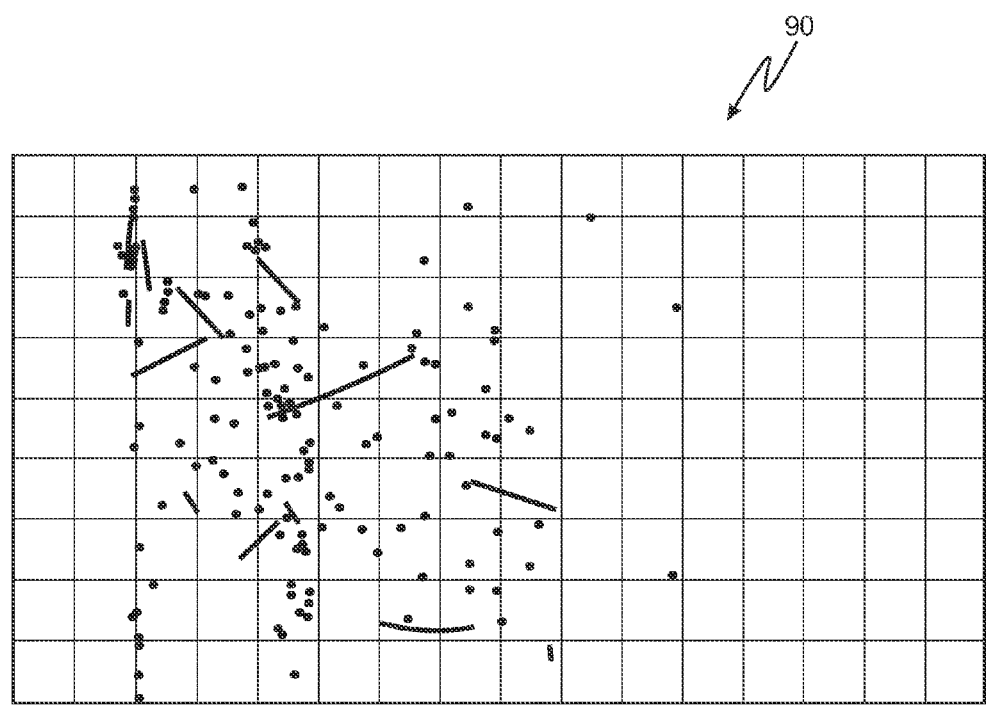
FIG. 15 shows touch results obtained on a touchscreen using a touchscreen controller not programmed or configured to operate in accordance with the noise avoidance methods and device disclosed herein.

FIG. 15 shows touch results obtained on a touchscreen 90 using a conventional Avago AMRI-5000 touchscreen controller 100 that was not programmed and configured to reduce noise interference in drive signals provided thereby in the presence of external noise signals. In FIG. 15, the signal generator had a frequency of 60.18 Hz, which was selected to mimic the characteristics of the LCD product mentioned above. In accordance with the above discussion, further characteristics of the LCD product employed were such that n was equal to 7, $k_{noise}$ was 0, and ($f_{fundamental,noise}$ initial) was set at 60.18×257. In FIG. 15, there was no target drive frequency for touchscreen controller 100. As shown in FIG. 15, finger touches, swipes and other gestures were not detected successfully by conventional touchscreen controller 100. Instead, and as shown in FIG. 15, external noise provided by the simulated noisy LCD overwhelmed the sensing capabilities of conventional touchscreen controller 100, resulting in many false touches being detected, and other touches not being not detected at all.

Figure 16:
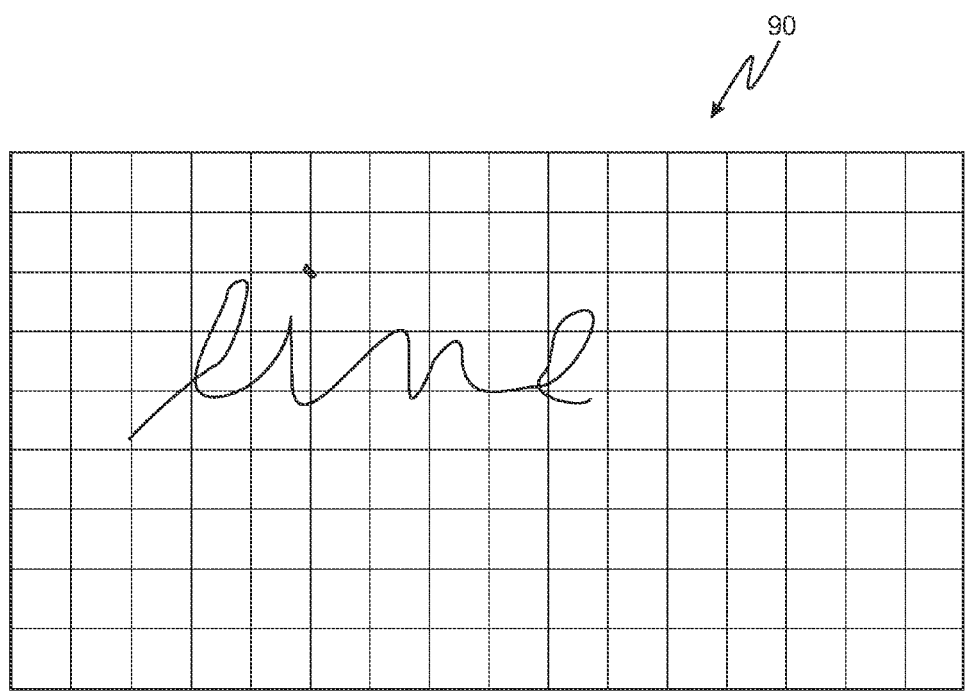
FIG. 16 shows touch results obtained on a touchscreen using a touchscreen controller programmed and configured to operate in accordance with the noise avoidance methods and device disclosed herein.

FIG. 16 shows touch results obtained on a touchscreen 90 using an Avago AMRI-5000 touchscreen controller 100 modified in accordance with the teachings presented herein. Touchscreen controller 100 of FIG. 16 was therefore programmed and configured to reduce noise interference in drive signals provided thereby in the presence of external noise signals, as described above. In FIG. 16, the signal generator had a frequency of 60.18 Hz, which was selected to mimic the characteristics of the LCD product mentioned above. In accordance with the above discussion, further characteristics of the LCD product employed were such that n was equal to 7, $k_{noise}$ was 0.75, and ($f_{fundamental,noise}$ initial) was set at 60.18×257. As shown in FIG. 16, a continuous finger touch across touchscreen 90 spelling the word "line" was detected successfully, despite the presence of significant simulated LCD noise.

Note that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A method of reducing interference between a first noise signal, and drive and sense signals, in a capacitive touchscreen system comprising a capacitive touchscreen and a touchscreen controller operably connected to the touchscreen and configured to provide the drive signals thereto and to receive the sense signals therefrom, the capacitive touchscreen comprising drive electrodes and sense electrodes, mutual capacitances existing between the drive and sense electrodes at locations where the drive and sense electrodes intersect, such mutual capacitances changing in the presence of one or more fingers or touch devices brought into proximity thereto, the method comprising:

receiving, in the touchscreen controller as an input thereto, a second noise signal related to the first noise signal, the second noise signal being generated by a device external to the capacitive touchscreen;

determining, in the touchscreen controller, an initial fundamental frequency and at least one initial harmonic frequency of the first noise signal;

adjusting, in the touchscreen controller, the frequency of the drive signal to an initial adjusted drive signal frequency that is greater than the fundamental frequency and less than the harmonic frequency;

determining, in the touchscreen controller, an updated fundamental frequency and an updated at least one initial harmonic frequency of the first noise signal, and adjusting, in the touchscreen controller, the initial adjusted frequency of the drive signal to an updated adjusted drive signal frequency that is greater than the updated fundamental frequency and less than the updated harmonic frequency.

2. The method of claim 1, wherein the initial adjusted drive signal frequency is between about 20% greater than the fundamental frequency and about 20% less than the harmonic frequency.

3. The method of claim 1, wherein the initial adjusted drive signal frequency is between about 30% greater than the fundamental frequency and about 30% less than the harmonic frequency.

4. The method of claim 1, wherein the initial adjusted drive signal frequency is between about 40% greater than the fundamental frequency and about 40% less than the harmonic frequency.

5. The method of claim 1, wherein the initial adjusted drive signal frequency is between about 50% greater than the fundamental frequency and about 50% less than the harmonic frequency.

6. The method of claim 1, further comprising providing wherein the source of the external noise signal is one of a liquid crystal display and a switched-mode power supply.

7. The method of claim 1, further comprising providing the noise signal from the source of the external noise signal as a direct input to the touchscreen controller.

8. The method of claim 1, further comprising incorporating the capacitive touchscreen system into a mobile electronic device.

9. The method of claim 8, wherein the mobile electronic device is one of a computer, a notebook computer, a laptop computer, a personal data assistant (PDA), a mobile telephone, a smart phone, an electronic book reader, a radio, an MP3 player, and a portable music player.

10. A method of reducing interference between a first noise signal, and capacitive touchscreen drive and sense signals, in a capacitive touchscreen system comprising a capacitive touchscreen and a touchscreen controller operably connected to the touchscreen and configured to provide the drive signals thereto and to receive the sense signals therefrom, the capacitive touchscreen comprising drive electrodes and sense electrodes, mutual capacitances existing between the drive and sense electrodes at locations where the drive and sense electrodes intersect, such mutual capacitances changing in the presence of one or more fingers or touch devices brought into proximity thereto, the method comprising:

receiving, in the touchscreen controller as an input thereto, a second noise signal related to the first noise signal, the second signal being generated by a device external to the capacitive touchscreen;

determining, in the touchscreen controller, an initial fundamental frequency $f_{fundamental,noise}$ of the first noise signal;

adjusting, in the touchscreen controller, the frequency of the drive signal to an initial adjusted drive signal frequency that is about $(n+k_{noise}) \times (f_{fundamental,noise}$ initial), where n is an integer;

determining, in the touchscreen controller, an updated fundamental frequency $f_{fundamental,noise}$ updated and adjusting, in the touchscreen controller, the initial adjusted frequency of the drive signal to an updated adjusted drive signal frequency that is about $(n+k_{noise}) \times (f_{fundamental,noise}$ updated), where n is an integer;

wherein $k_{noise}$ is a constant value.

11. The method of claim 10, wherein $k_{noise}$ ranges between about 0.001 and about 0.999.

12. The method of claim 10, wherein $k_{noise}$ ranges between about 0.01 and about 0.99.

13. The method of claim 10, wherein $k_{noise}$ ranges between about 0.1 and about 0.9.

14. The method of claim 10, wherein $k_{noise}$ ranges between about 0.5 and about 0.9.

15. The method of claim 10, wherein $k_{noise}$ is selected from the group consisting of about 1/8, about 1/4, about 1/3, about 3/8, about 1/2, about 5/8, about 2/3, about 3/4, and about 7/8.

16. The method of claim 10, wherein $k_{noise}$ is selected from the group consisting of about 13/16, about 15/19, about 21/25, about 33/43, and about 49/57.

17. The method of claim 10, wherein $k_{noise}$ comprises a first odd integer as a denominator thereof, and a second odd integer as a denominator thereof.

18. The method of claim 17, the first odd integer is greater than 11 and the second odd integer is greater than 13.

19. The method of claim 10, further comprising providing wherein the source of the external noise signal is one of a liquid crystal display and a switched-mode power supply.

20. The method of claim 10, further comprising providing the noise signal from the source of the external noise signal as a direct input to the touchscreen controller.

21. The method of claim 10, further comprising incorporating the capacitive touchscreen system into a mobile electronic device.

22. The method of claim 21, wherein the mobile electronic device is one of a computer, a notebook computer, a laptop computer, a personal data assistant (PDA), a mobile telephone, a smart phone, an electronic book reader, a radio, an MP3 player, and a portable music player.

* * * * *